United States Patent [19]

Bodine

[11] Patent Number: 4,791,899
[45] Date of Patent: Dec. 20, 1988

[54] ACOUSTIC DETONATION SUPPRESSION IN INTERNAL COMBUSTION ENGINE

[76] Inventor: Albert G. Bodine, 7877 Woodley Ave., Van Nuys, Calif. 91406

[21] Appl. No.: 6,481

[22] Filed: Jan. 23, 1987

[51] Int. Cl.$^4$ ............................................. F02F 3/26
[52] U.S. Cl. .................................... 123/279; 123/660
[58] Field of Search ............... 123/657, 660, 256, 276, 123/279, 193 P

[56] References Cited

U.S. PATENT DOCUMENTS

| | | | |
|---|---|---|---|
| 1,754,758 | 4/1930 | Muckenhirn | 123/256 |
| 2,738,781 | 3/1956 | Bodine | 123/660 |
| 2,760,473 | 8/1956 | Bodine | 123/660 |
| 2,760,474 | 8/1956 | Bodine | 123/660 |
| 2,827,033 | 3/1958 | Bodine | 123/660 |
| 2,881,743 | 4/1959 | Holt | 123/276 |

Primary Examiner—Charles J. Myhre
Assistant Examiner—David A. Okonsky
Attorney, Agent, or Firm—Edward A. Sokolski

[57] ABSTRACT

The piston of an internal combustion engine has an odd number of sockets formed in the top surface thereof. With the piston in its top dead center position, a thin slit is formed between the cylinder head and the top of the piston. The sockets form acoustical chambers for detonation waves which may be generated in the cylinder such that with the piston in its top dead center position, these detonation waves travel in random fashion between the acoustical chambers formed by the sockets thereby attenuating such waves and minimizing the effects of detonation.

6 Claims, 1 Drawing Sheet

ACOUSTIC DETONATION SUPPRESSION IN INTERNAL COMBUSTION ENGINE

This invention relates to internal combustion engines and more particularly to apparatus for acoustically damping the detonation waves generated in the cylinders of such an engine. In internal combustion engines due to such factors as improper spark advance, inferior fuel, high power loading, too high a compression ratio, for available fuels, etc. irregularities of combustions can occur which result in the generation of detonation waves. This not only causes unsatisfactory engine performance but also places great stress on the engine which can cause damage thereto. Detonation waves are high energy sound waves which often resonate with a standing wave pattern. Acoustical methods and apparatus for suppressing such detonation waves to overcome this problem are described in my U.S. Pat. Nos. 2,573,536 and 2,828,731. In the '536 patent the use of anechoic chambers, Helmholtz resonators and absorption material in the cylinder and/or piston is described to spoil or attenuate the sonic waves generated. The '731 patent describes the use of ridges of porous material which form walls or septums on the top of the cylinder. These septums as described in the '731 patent are preferably odd in number and run the distance between the top of the piston and the roof of the combustion chamber when the piston is at top dead center. These septums which may be of suitable porous sound wave absorptive or dissipative material provide effective frictional or resistive impedance to the detonation waves serving to dissipate a large proportion of the energy thereof.

It has been found that while the use of such septums in the manner described is quite effective in dissipating detonation waves, there are several shortcomings of this device. First, it has been found that the septums tend to act as heat sinks so as to wastefully extract valuable heat energy from the hot combustion gasses. Further, the septums tend to become overheated causing pre-ignition hot spots in the combustion chamber.

The device of the present invention affords an improvement over the prior art in obviating the aforementioned shortcomings and at the same time providing highly effective attenuation to the detonation waves. The improvement of the present invention is achieved by employing an odd number of cavities which may be in the form of hemispherical sockets or the equivalent formed in the top of the piston which individually would form resonator chambers for the acoustical waves. With the piston at top dead center, there is a very thin slit layer formed between the top of the piston and the cylinder head wherein the anti-nodal regions of the acoustical wave patterns tend to be trapped. The oscillating gasses forming the acoustical waves travel back and forth between the chambers through the slit. In view of the odd number of chambers these waves arrive at the individual chambers in a random fashion and in random or non-reinforcing phase relationship which obviates the formation of a resonant standing wave pattern and rather tends to result in interference between the wave patterns. The acoustical energy is thus effectively attenuated to minimize the detonation effect.

Stated precisely, in order to have good strong resonance the oscillating gas body in the slit layer must provide the inductive reactance of the acoustic resonant circuit. Moreover, the cavities must provide the necessary cooperative capacitance. With multiple cavities the system becomes a system of coupled Helmholtz resonators. With two cavities of approximately equal reactances under the condition of resonance the inductive capacitance, or gas mass, in the connecting neck or slit has a clear cut function of in effect "bouncing between" the two capacitances. However, if there are three cavities then the gas layer or mass in the slit no longer has a viable capacitance at each end of its inductive flow. This gas mass does not have a set direction or frequency of oscillation because it no longer has equal capacitance at each end of its stroke. The gas slug would need one frequency for bouncing against one cavity but a different frequency for bouncing against the other two cavities in a three cavity system. On the other hand with paired cavities (i.e. an equal number of cavities) the sonic spring action of the cavities is equally divided so as to cause the gases to vigorously run back and forth across the slit and thus build up strong resonance. The acoustical Q is high with an even number of cavities and very low with an odd number.

As illustrated in FIGS. 2-5 of my U.S. Pat. No. 2,828,731, we find that in stand engines the resonance in a circular combustion chamber necessarily will break up into an even numbered node and antinode pattern. The nodal regions present the capacitive response, these nodal regions becoming tightly located by the cavities. However, as indicated by the pattern shown in the '731 patent, the use of an odd number of such cavities impedes resonant vibration. The acoustic resonance thus cannot get started nor can it build up by extracting phased energy pulses from the combustion heat and pressure.

It is therefore an object of this invention to minimize detonation in the cylinders of an internal combustion engine.

It is a further object of this invention to provide for the acoustical attenuation of detonation waves in a combustion chamber.

Other objects of this invention will become apparent as the description proceeds in connection with the accompanying drawings of which:

Figure 1:
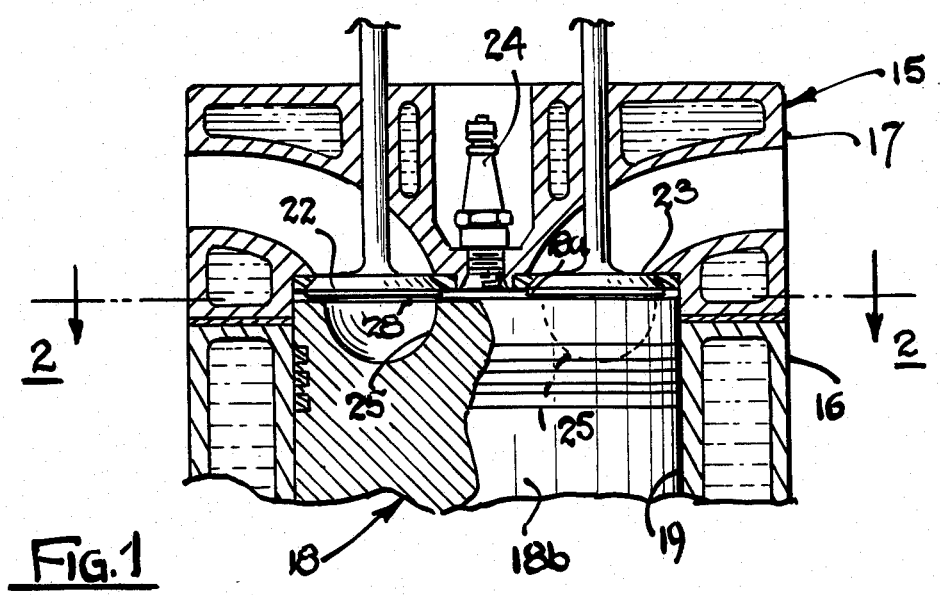
FIG. 1 is a cross-sectional view illustrating a preferred embodiment of the invention.
Figure 2:
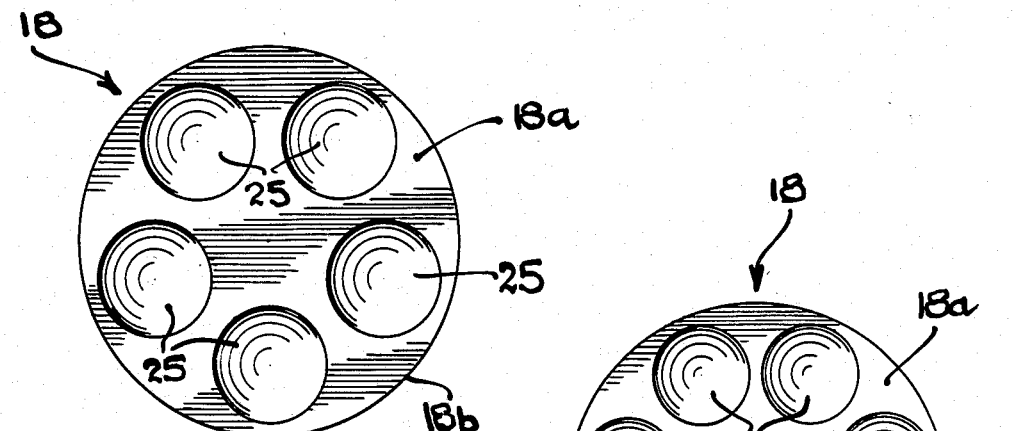
FIG. 2 is a cross-sectional view taken along the plane indicated by 2—2 in FIG. 1.

Referring now to the figures, internal combustion engine 15 has a typical engine block 16 with one or more cylinders 19 formed therein with a piston 18 mounted in each such cylinder for reciprocating motion in typical fashion. Also a typical cylinder head 17 is employed with an intake valve 22 and an exhaust valve 23 as well as a spark plug 24 for igniting the combustion mixture in the cylinder; these elements all being common to a typical internal combustion engine.

Figure 3:
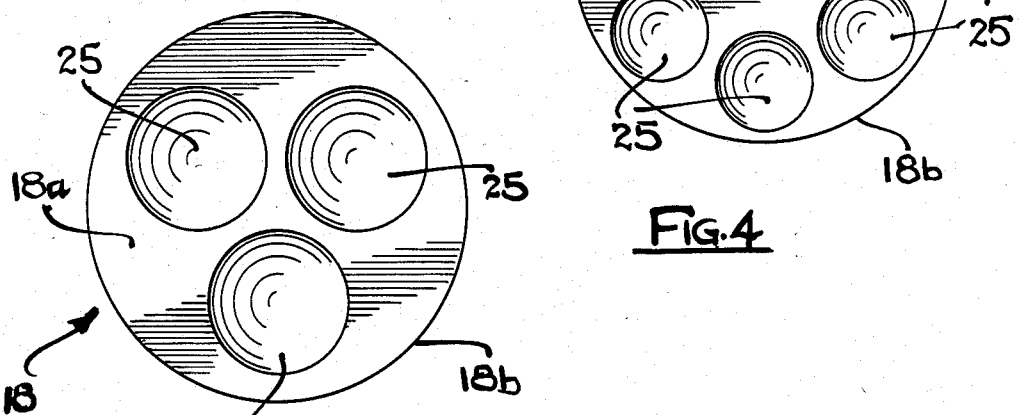
FIG. 3 is a cross-sectional view similar to that of FIG. 2 showing an alternative configuration employing three sockets.
Figure 4:
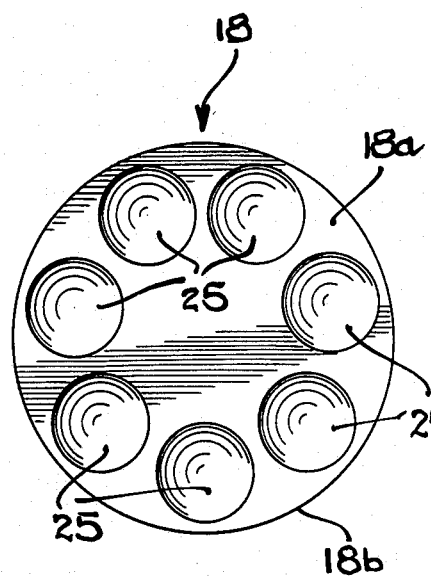
FIG. 4 is a cross-sectional view similar to that of FIG. 2 showing an alternative configuration employing seven sockets.

The novelty of the present invention is involved with the odd number of sockets 25 formed in the top 18a of the piston. Sockets 25 can be generally hemispherical such as to provide discrete capacitance and as indicated in the preferred embodiment are five in number. The depth and width of the sockets is not critical and will vary with the surface area of the piston and the number of sockets. Other odd numbers of such sockets can be used such as three as shown in FIG. 3 or seven as shown in FIG. 4, as particular application requirements may dictate to achieve maximum attenuation to the detonation waves in the particular cylinder involved. These sockets should preferably be spaced all around the expanse of the piston head in a random manner. Sockets 25 are formed in a thick crown portion 18b of the piston. These sockets do not have to be precisely equally spaced, in fact one or two for example can be located under the valve heads to provide clearance thereabove in a valve-phased engine.

With the piston 18 at top dead center as shown in FIG. 1, a thin slit 28 is formed between the piston and the cylinder head which typically is of the order of 0.025-0.050 inches. The anti-nodal regions of most of the detonation wave patterns tend to be trapped in this flat slit. The typical lower frequencies for longer wave lengths of the gas oscillations which appear in the cylinder necessarily occur by virtue of the gasses surging in anti-nodal regions across the thin slit 28. This provides a highly attenuative travel path because of the friction effects of this large area slit. Moreover, the anti-nodal path lengths in this slit vary considerably between regions of one socket and an adjacent socket, i.e. the sockets are closest together at only one point of the rim of each socket causing phase discrepancies between the various portions of the wave patterns of the gas travelling in and out of each socket, this further enhancing attenuation. Also, the use of an odd number of sockets all of generally the same size and distributed in a circle around the piston head provides for random phasing of the waves traveling back and forth between the sockets which tends to obviate the formation of standing wave vibration patterns between the sockets. Any resonant vibrations which might occur tend to have a desirably low "Q".

While the invention has been described and illustrated in detail, it is to be clearly understood that this is intended by way of illustration and example only and is not to be taken by way of limitation, the spirit and scope of the invention being limited only by the terms of the following claims.

I claim:

1. In the combustion chamber of an internal combustion engine having a piston slidably mounted in a cylinder, said piston having a top surface, such cylinder having a head which is directly opposite the top surface of the piston when it is in its top dead center position, there being a clearance volume between the top of the piston and the cylinder head, means for attenuating acoustical waves generated in said cylinder comprising:
   an odd number of sockets forming a part of the top surface of the piston,
   a thin slit being formed between the cylinder head and the top surface of the piston with the piston in its top dead center position such that substantially all of the clearance volume between the cylinder head and the top of the piston with the piston in said position is contained within said sockets;
   said sockets forming acoustical chambers between which acoustical waves travel in random fashion through said slit with the piston in top dead center thereby attenuating the acoustical waves.

2. The device of claim 1 wherein said sockets are substantially hemispherical in shape.

3. The device of claim 1 wherein the piston has a thick crown portion, said sockets being formed within said crown portion of the piston.

4. The device of claim 1 wherein said sockets are five in number.

5. The device of claim 1 wherein said sockets are three in number.

6. The device of claim 1 wherein said sockets are seven in number.

* * * * *